United States Patent [19]

Sharangpani et al.

[11] Patent Number: 4,944,806
[45] Date of Patent: Jul. 31, 1990

[54] RIGMENTARY SALT OF A TRIPHENYLMETHANE COMPOUND AND PROCESS FOR MAKING SAME

[75] Inventors: Anand S. G. Sharangpani; Floyd G. Spence, both of Holland; Brian D. Teunis, Grand Haven, all of Mich.

[73] Assignee: BASF Corporation, Parsippany, N.J.

[21] Appl. No.: 138,323

[22] Filed: Dec. 28, 1987

[51] Int. Cl.$^5$ .............................................. C08K 5/00
[52] U.S. Cl. ..................................... 106/493; 106/500
[58] Field of Search ............................ 106/288 Q, 309

[56] References Cited

U.S. PATENT DOCUMENTS

| | | | |
|---|---|---|---|
| 3,925,094 | 12/1975 | Papenfuss et al. | 106/288 Q |
| 4,061,464 | 12/1977 | Hahnke et al. | 8/528 |
| 4,062,877 | 12/1977 | Hahnke et al. | 260/391 |
| 4,445,904 | 5/1984 | Hähnk et al. | 8/538 |

Primary Examiner—A. Lionel Clingman
Assistant Examiner—Willie J. Thompson
Attorney, Agent, or Firm—Rupert B. Hurley, Jr.

[57] ABSTRACT

Pigmentary Opal Sulfate is made by combining triphenylpararosaniline (Opal Blue) with a dilute acid. The pigmentary Opal Sulfate is a substitute for Alkali Blue. The most preferred process for producing the pigmentary Opal Sulfate involves drowning a solution of Opal Blue in a highly agitated solution of dilute sulfuric acid.

15 Claims, 3 Drawing Sheets

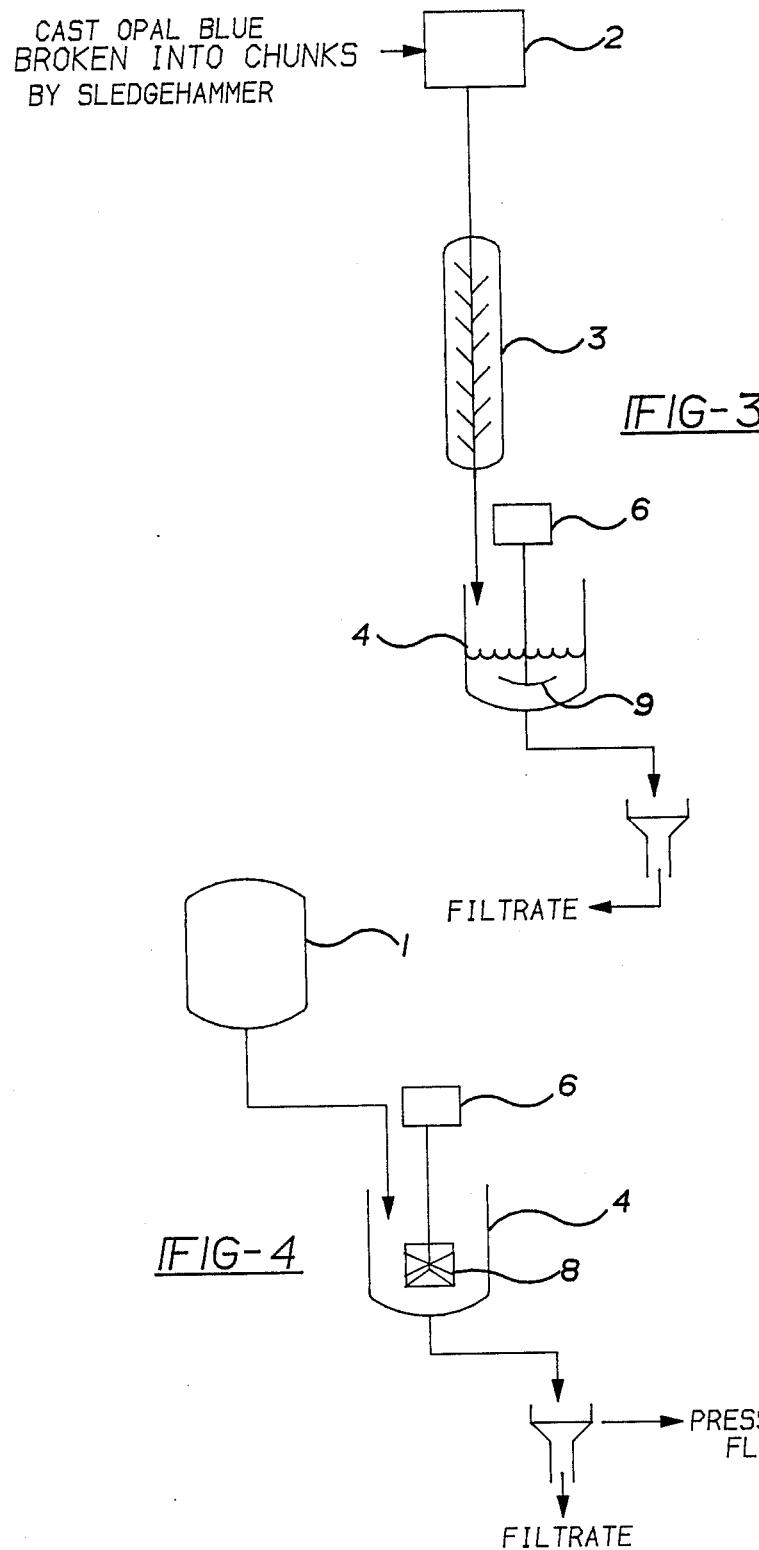

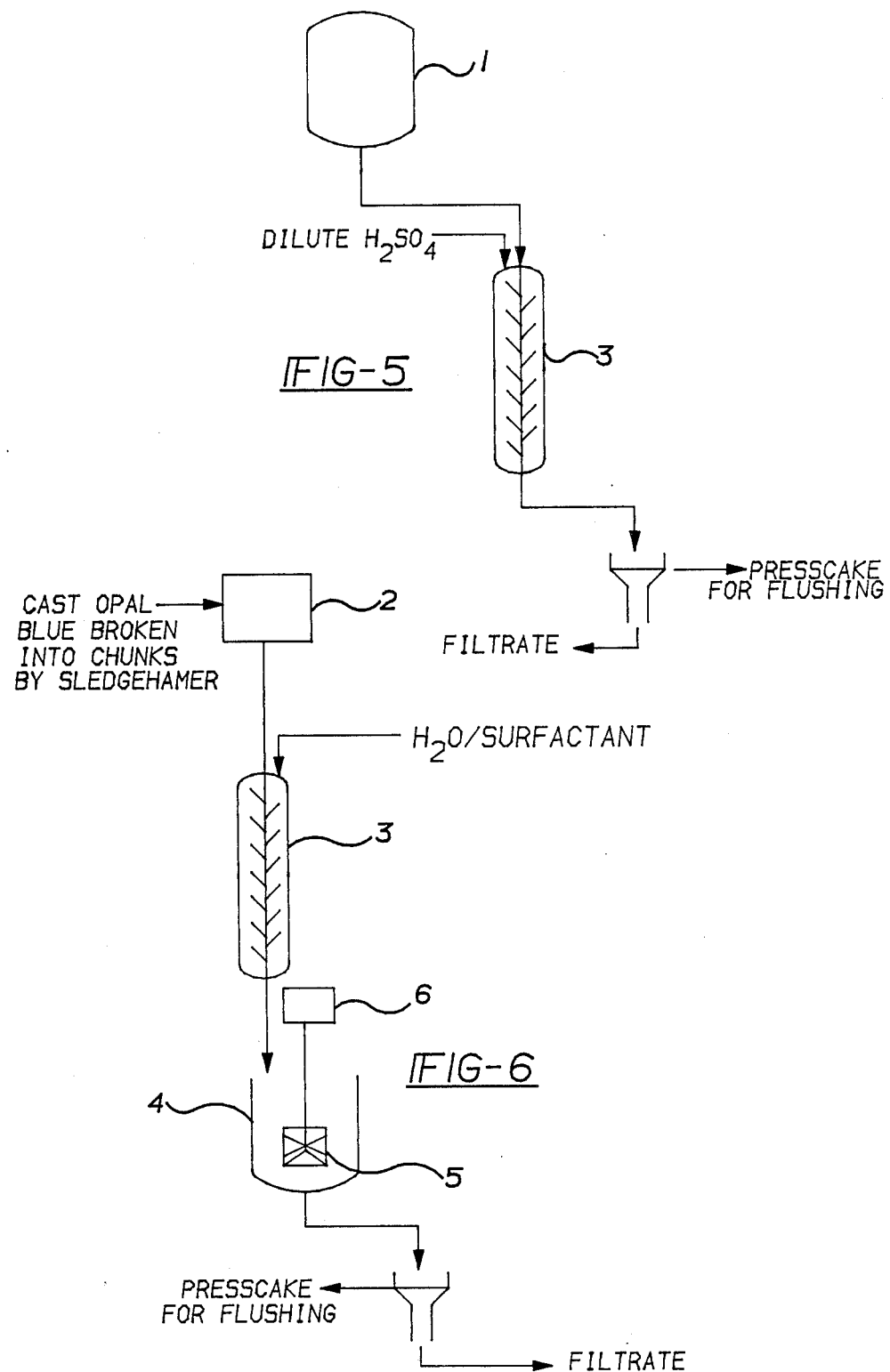

PIGMENTARY SALT OF A TRIPHENYLMETHANE COMPOUND AND PROCESS FOR MAKING SAME

Background of the Invention

The present invention pertains to the field of organic pigment compositions useful for imparting color. More specifically, the present invention pertains to an alternative for triphenylmethane-type pigments. This alternative is preferably a pigmentary salt of triphenylpararosaniline. Most preferably the salt is a monosulfate salt of triphenylpararosaniline.

Salts of the triphenylpararosaniline ("TPPR") are not new. In the prior art, salts of TPPR have been produced as intermediates in processes for producing Alkali Blue. The difference between salts of TPPR and Alkali Blue is found in the nature of the bond. Alkali Blue is a sulfonate, i.e. there is a covalent bond between the sulfur atom and the TPPR. Pararosaniline monosulfate is a salt, i.e. there is an ionic "bond" between the sulfate group and the TPPR molecule. Although salts of TPPR have been produced in the past as intermediates in Alkali Blue production, they have not been produced in pigmentary form. Applicants are unaware of any prior art teaching in which a pigmentary TPPR salt was produced. Applicants have unexpectedly found a process for producing a pigmentary salt of TPPR. This process entails, in general, treating TPPR with a dilute acid so that a pigmentary salt of TPPR is formed. This process has been found to provide some unexpected advantages over current processes for the production of Alkali Blue pigment compositions. First, the amount of sulfuric acid required to make a salt of TPPR has been found to be much less than the amount of sulfuric acid required to make Alkali Blue pigment compositions from TPPR. Secondly, it has unexpectedly been found that problems of polysulfonation in Alkali Blue manufacture can be avoided by formation of the sulfate salt of TPPR.

The closest prior art currently known to applicants consists of U.S. Pat. No. 3,671,553; U.S. Pat. No. 3,439,004; and U.S. Pat. No. 4,321,207. Although all of these patents teach the production of Opal Sulfate, none of them teaches the production of pigmentary Opal Sulfate.

U.S. Pat. No. 3,671,553 (hereinafter the '553 patent) to Papenfuss et al, is directed to dyestuffs of monosulfonic acids of triphenylmethane. This patent describes how to make a "color base sulfate," which is an intermediate in the production of a monosulfonated molecule. The '553 patent nowhere teaches a pigmentary form of the color base sulfate. Rather, in the '553 patent, the color base sulfate remains in solution, in preparation for making it into a dye.

U.S. Pat. No. 3,439,004 (hereinafter the '004 patent) relates to triarylmethane dye. Although the '004 patent teaches how to make a "dye product" (column 1, line 20), the '004 patent also states that the "dye product . . . makes an excellent pigment" (column 1, lines 20–22). A review of this patent shows that it does not pertain to Opal Blue. In fact, it specifically teaches away from Opal Blue (column 2, lines 4–7). Furthermore, the '004 patent is directed only to triaminotriaryl urethane compounds which have at least one cyclohexyl substituent attached to the amino group. In contrast, Opal Sulfate has phenyl substitutes attached to the amino group.

U.S. Pat. No. 4,321,207 (hereinafter the '207 patent) relates to a broad spectrum of triphenylmethane dyes. Although the '207 patent refers to the dyes in their "solid form" (column 1, line 65; column 3, lines 26–8; and column 6, line 69, to column 7, line 2), the '207 patent nowhere mentions a pigmentary form of the solid.

BRIEF SUMMARY OF THE INVENTION

The present invention pertains to both a pigment composition and a process for making that composition. The pigment composition comprises a resin tree salt of a triphenylmethane compound wherein the triphenylmethane compound has the following structure:

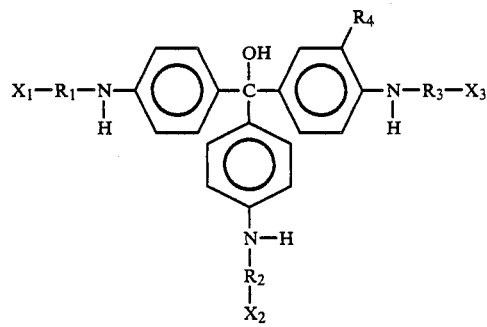

and wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$, or $X_3$ is hydrogen when the corresponding $R_1$, $R_2$ or $R_3$ is a direct linkage. As used herein, the term "pigmentary" refers to colored particulates having a size range of from approximately 100 micrometers to 0.01 micrometers. Preferably, the composition comprises approximately 50 percent (by weight of composition) water and approximately 45 percent (by weight of composition) pigment. Furthermore, it is preferred that the salt is a "mono-salt", i.e. that only one sulfate group, for example, is associated with each "Opal cation". Preferably the pigment is a monosulfate salt of TPPR.

The invention also pertains to a method of making a pigmentary salt of a triphenylmethane compound wherein the triphenylmethane compound has the following structure:

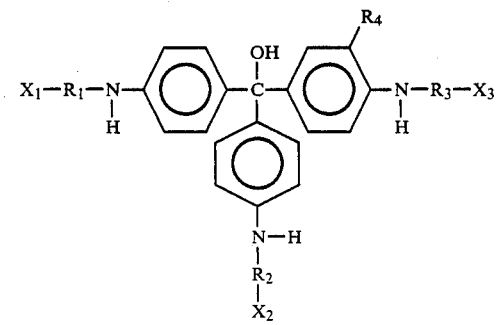

and wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ or $R_3$ is a direct linkage.

The method comprises treating the triphenylmethane compound with a dilute acid selected from the group consisting of sulfuric acid, phosphoric acid, and hydrochloric acid, so that a pigmentary triphenylpararosaniline salt is formed. In addition, nitric acid may be used, but risk of explosion exists if nitric acid is combined with TPPR. More specifically, the treatment with dilute acid (most preferably sulfuric acid) can be carried out in any one of a variety of ways. Several examples of effective ways to treat the most preferred member of this group of compounds, TPPR, are described in detail below.

BRIEF DESCRIPTION OF THE DRAWINGS

FIGS. 1 through 6 are schematics of various processes which can be used to make pigmentary Opal Sulfate.

DETAILED DESCRIPTION OF THE PREFERRED EMBODIMENTS

The present invention pertains to pigmentary salts of triphenylmethane compounds and especially to pigmentary TPPR salts and a processes for making same. The process can be carried out, for example, by drowning a solution of TPPR in a solution of dilute sulfuric acid while maintaining the dilute acid solution in a state of high turbulence.

Preferably, the pigment composition of the present invention is a salt of TPPR wherein the salt is selected from the group consisting of sulfate, chloride, and phosphate. Sulfate is the most preferred salt. Furthermore, the salt preferably has only one sulfate group in association with each TPPR molecule.

Although the pigment composition of the invention is generally produced in an aqueous system, it may be dispersed into an oil using conventional flushing procedures.

Although the method of the present invention is applicable to triphenylmethane compounds in general, the method of the present invention is preferably carried out by drowning a solution of TPPR in a dilute acid solution. Preferably, the dilute acid solution is highly agitated during the addition of the TPPR solution. The agitation is preferably carried out by a high shear, turbulent mixer. Preferably, the acid is sulfuric acid.

Alternatively, the pigmentary Opal Sulfate of the present invention can be made by milling an aqueous slurry of TPPR in an abrasive media, in the presence of dilute acid. "Particulate TPPR" is TPPR which is larger than pigmentary but which is small enough to be ground in the Attritor. Preferably the particulate TPPR is reduced to a size of approximately 0.0164 inches (i.e. #40 sieve) before the particles are ground in the media mill in the presence of dilute acid. Preferably the media mill is of a type selected from the group consisting of Attritors, wet mills, bead mills, sand mills, etc., and preferably the media has a size between 1 mm and 4 mm. Both pressurized and non-pressurized mills are believed operable. Sulfuric acid is a preferred acid for use in this alternative process.

Figure 1:
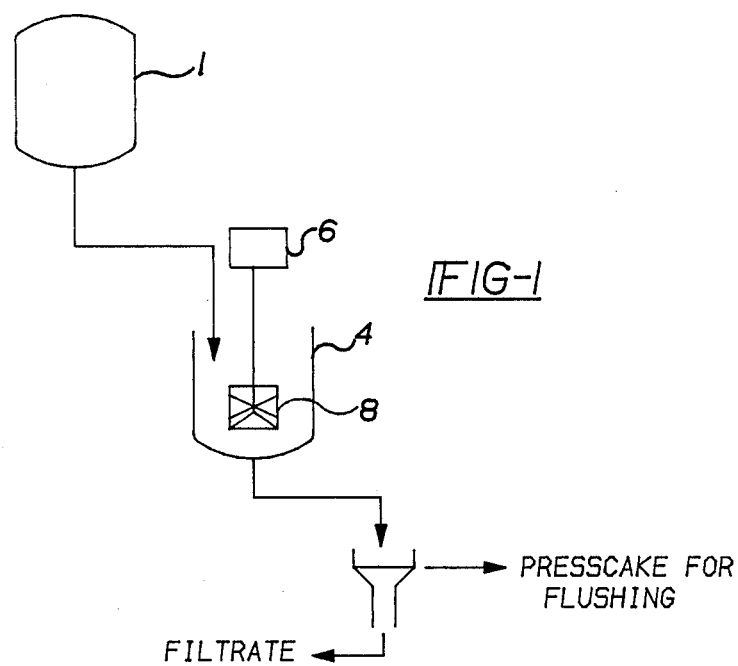

Examples 1 through 3 were carried out as shown in FIG. 1.

EXAMPLE 1

Six grams of a solution of 35 percent (by weight) Opal Blue in aniline were combined [in a tank (1)] with 15 grams of additional aniline, after which the resulting solution was heated to 65° C. Then 41.8 grams of 95.8 percent sulfuric acid were combined [in a beaker (4)] with 358.2 grams of water, with agitation. The sulfuric acid solution (4) was then heated to 40° C. The Opal Blue/Aniline solution was then added slowly and uniformly, over a period of 30 minutes, to the dilute sulfuric acid solution. During addition of the Opal solution to the acid solution, the acid solution was agitated by a high turbulence, high speed agitation system, (8 and 6). The combination of the Opal Blue and the dilute sulfuric acid formed an Opal Sulfate slurry. The temperature of the resulting Opal Sulfate slurry rose to 50° C. The Opal Sulfate slurry was then stirred for 30 minutes, after which the temperature was 55° C. The Opal Sulfate slurry was then filtered and was washed resulting in a presscake weighing 5.25 grams.

EXAMPLE 2

The process utilized in Example 2 is also illustrated by FIG. 1. A mixture of 125.4 grams of 96 percent (by weight) sulfuric acid and 1074.6 grams of water was made in a 3-liter beaker (4). The mixture was agitated by a high-turbulence, high speed agitation system (6 and 8). The mixture was then heated to 45° C. after which 0.6 gram of Armeen ® 18D was added.

45.0 Grams of aniline were then mixed with 18.0 grams of a solution of Opal Blue in aniline (35 parts, by weight, of Opal Blue to 65 parts, by weight, of aniline). Then 0.9 Grams of a straight-chain dodecylbenzene sodium sulfonate surfactant were added. This mixture (made in Tank 1) was then simultaneously stirred and heated to 65° C.

The Opal Blue solution was then slowly added to the acid solution, over a period of five minutes. The addition of the Opal solution to the dilute acid solution resulted in the formation of an Opal Sulfate slurry. During addition of the Opal solution to the acid solution, the acid solution was agitated with the high-turbulence, high-speed agitation system. After addition of the Opal solution, the resulting mixture (i.e. the Opal Sulfate slurry) was agitated (via a high turbulence, high speed agitation system) for a 30 minute period. During this time the temperature of the Opal Sulfate slurry rose to 75° C. The resulting slurry, containing pigmentary Opal Sulfate, was filtered and washed. The resulting presscake weighed 26.0 grams.

EXAMPLE 3

The procedure described in Example 2 was again carried out except that 1.5 grams of the surfactant were added to the sulfuric acid solution, while no surfactant was added to the Opal Blue/Aniline solution. The process resulted in a presscake weighing 26.3 grams.

ANALYSIS OF OPAL SULFATES

Obtained in Experiments 1, 2, and 3

A spectrophotometric analysis was used in order to evaluate the color properties of the Opal Sulfates produced via Examples 1, 2, and 3. The analysis gave the following results:

| Presscake from Example No. | Percent Pigment |
| --- | --- |
| 1 | 28.8 |
| 2 | 20.4 |
| 3 | 21.3 |

Then each presscake was analyzed via a computerized CIELAB system. The CIELAB measurements were taken by comparing the pigmentary TPPR salt presscake with the Alkali Blue presscake of Example 9 (infra). The results were as follows:

| Presscake from Example No. | DE | DL | DC | DH | DA | DB | Strength in Parts |
| --- | --- | --- | --- | --- | --- | --- | --- |
| 1 | 5.13 | 0.74 | 2.46 | −4.44 | −4.68 | −1.97 | 96.50 |
| 2 | 6.76 | 2.35 | 3.62 | −5.19 | −5.57 | −3.02 | 111.22 |
| 3 | 6.07 | 1.69 | 2.34 | −5.34 | −5.57 | −1.71 | 104.11 |

EXAMPLE 4

Figure 2:
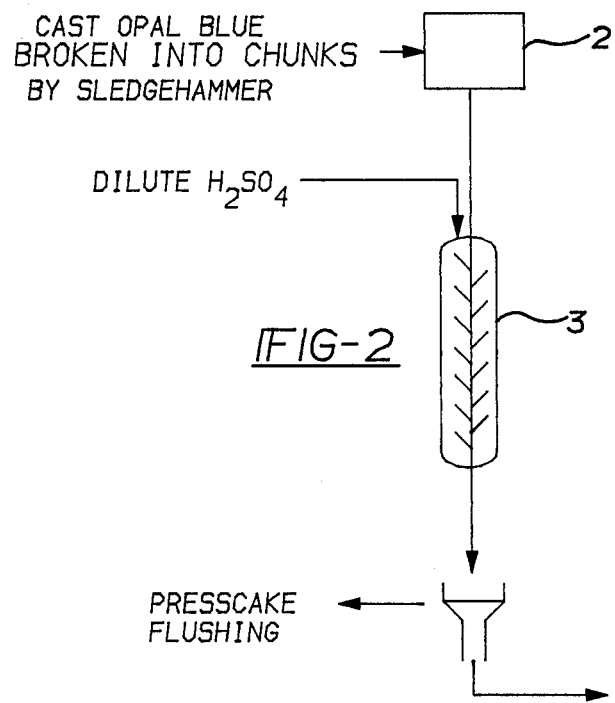

This example illustrates another process for making the pigmentary Opal Sulfate. FIG. 2 illustrates a schematic of this process. In general, this process was carried out by first producing an Opal Blue solid which was then broken up with a sledgehammer, followed by milling in a hammer mill (2), in order to produce an Opal Blue powder. The powder was then fed into an Attritor (3), along with a stream of dilute sulfuric acid. The liquid and pigmentary Opal Sulfate which emerged from the Attritor were filtered.

More specifically, the following procedure was carried out. An Attritor was charged with 630 cc of ceramic media. Then 61 grams of 82 percent by weight Opal Blue, which had been passed through a 40 mesh screen, was weighed out and placed in a 600 ml beaker. Then 313 ml of water was added to the beaker along with 2.5 grams of a surfactant (Miranol JS ®). The beaker contents were then stirred with a glass rod and poured into the Attritor. The Attritor was jacketed with 55° C. water. The Attritor was then run for one hour, following which 20 grams of concentrated sulfuric acid were added. The Attritor then ground the contents for six hours, after which the Attritor was shut down and cooled with tap water for 20 minutes while on low speed. The Attritor was then shut down and the contents were rinsed into a 4 liter beaker. The media were recovered by decanting and rinsing until the liquid volume reached approximately 4 liters. The filtrate was polished by passing it through an 80 mesh screen. The filtrate was then filtered through a No. 54 paper and washed with 200 ml water. The resulting cake was then pressed dry. The presscake weighed 148 grams.

The presscake was evaluated as described in the "Analysis" section following Examples 1-3. The results were as follows:

| Presscake from Example No. | DE | DL | DC | DH | DA | DB | Strength in Parts |
| --- | --- | --- | --- | --- | --- | --- | --- |
| 4 | 6.93 | 1.03 | 0.74 | 6.81 | 6.77 | −1.01 | 110–119 |

EXAMPLE 5

This example illustrates still another process for making the pigmentary Opal Sulfate. FIG. 3 illustrates a schematic of this process. In general, the process entailed producing an Opal Blue solid which was first broken up into chunks, following which the Opal Blue was fed into a hammer mill (2), in order to produce an Opal Blue powder. The powder was then fed into an Attritor (3), in which the Opal Blue powder was reduced to a pigmentary particle size. The materials emitted from the Attritor were directed into a container (4) having a dilute solution of sulfuric acid therein, the acid solution being stirred by a pitched blade turbine agitator (6 and 9). This resulted in the formation of a pigmentary Opal Sulfate slurry, which was then separated from the filtrate by filtration.

EXAMPLE 6

This example illustrates still another process for making pigmentary Opal Sulfate. FIG. 4 illustrates a schematic of this process. In general, the process was carried out by drowning a solution of Opal Blue [initially within container (1)] in N-methyl-2-pyrrolidone into a dilute sulfuric acid solution (initially within container 4) which was under low turbulence, via a low-turbulence stirrer (6 and 8). The product from this addition was an Opal Sulfate slurry, the Opal Sulfate having a particle size slightly larger than the desired size range. The resulting pigmentary Opal Sulfate was filtered.

More specifically, the following procedure was carried out. 172.2 Grams of N-methyl-2-pyrrolidone were added to a 250 ml Erlenmeyer flask, which were then stirred and heated to 50° C. Then 73.8 grams of flaked Opal Blue solid were slowly added, with continuous stirring and heating until the Opal Blue was dissolved. Next, 794.1 grams of ice were added to a 3-liter beaker (4), followed by 435.9 grams of 96 percent sulfuric acid. A mechanical agitator (6 and 8) was installed in the 3-liter beaker. The mechanical agitator (6 and 8) was a 4 bladed turbine laboratory-scale agitator.

The solution of Opal Blue (from above) was then slowly added to the dilute sulfuric acid. The solution was vigorously agitated (the mechanical agitator was set on high speed) while the Opal solution was added to the acid at a rate of approximately one drop per second. The initial temperature of the acid solution was approximately 23° C. After addition of the Opal Blue to the acid solution, the stirring was continued for one-half hour. The resulting Opal Sulfate slurry was then filtered (through #54 paper), washed with four 250 ml aliquots of water, and was pressed dry. This presscake was also evaluated as described in the "Analysis" section following Examples 1-3. The results were as follows:

| Presscake from Example No. | DE | DL | DC | DH | DA | DB | Strength in Parts |
| --- | --- | --- | --- | --- | --- | --- | --- |
| 4 | 6.74 | −1.11 | 5.43 | 3.83 | 2.66 | −6.09 | 95.82 |

EXAMPLE 7

This example illustrates still another process for making pigmentary Opal Sulfate. FIG. 5 illustrates a schematic of this process. In general, the process was carried out by feeding a dilute solution of Opal Blue in aniline

[initially within container (1)] into an Attritor (3), while feeding dilute sulfuric acid into the Attritor. Pigmentary Opal Sulfate was formed in the Attritor. The mixture emerging from the Attritor was then filtered, washed, and isolated.

More specifically, 585 ml of ⅛" diameter ceramic beads were used to charge the Attritor. Then 76 grams of sulfuric acid were mixed with 203 grams of ice. The resulting dilute sulfuric acid solutions was added to the Attritor, and the Attritor was rotated at 600 rpm. The Attritor was jacketed with cooling water. The solution of Opal Blue (prepared above) was then added (via pipette) to the Attritor over a period of eight minutes. Milling was continued for six hours after addition of the Opal Blue solution. The product, an Opal Sulfate slurry, was allowed to stand overnight in the Attritor, and the next day was rinsed into a 4-liter beaker. The mixture was then decanted and washed through a 20 mesh sieve, filtered, washed, and pressed dry.

EXAMPLE 8

This example illustrates still a further process for making pigmentary Opal Sulfate. FIG. 6 illustrates a schematic of this process. In general, cast Opal Blue solid was broken up into chunks and fed into a hammer mill (2), where the Opal Blue chunks were reduced to Opal Blue powder. The Opal powder was then mixed with a water/surfactant solution, this mixture then being fed into an Attritor (3). The pigment-sized Opal particulate material emerging from the Attritor (along with the water and surfactant) was then slowly fed into a dilute sulfuric acid solution, while the dilute acid solution was subjected to high turbulence, via a high-turbulence, high-speed agitator. This step resulted in the formation of pigmentary Opal Sulfate.

More specifically, a 50 gram sample of red shade Opal Blue (approximately 72 percent, by weight, TPPR) was ground and sieved through a #40 mesh screen. The sample was mixed at 20 percent (by weight) concentration in water. Approximately 1 percent (based on weight of Opal Blue) surfactant was added. The surfactant was an amphoteric wetting agent. This mixture was added to an Attritor, to which approximately 10 percent (by volume) of 1 mm carbon steel media was added. The Attritor was run at 600 rpm for 24 hours, with cooling water on the jacket of the Attritor. The media and the Opal Blue were then separated through a #20 mesh screen. The Opal Blue was then reslurried into water at about 20 percent by volume. The Opal Blue was then drowned into a high turbulence zone of 10 percent (by volume) sulfuric acid at 60° C. The slurry was then agitated at 60° C. in high turbulence (created by a high turbulence, high-speed agitation system) for 30 minutes, after which the resulting slurry of pigmentary Opal Sulfate was filtered and the resultant cake was washed with water.

EXAMPLE 9 (COMPARATIVE & CONTROL)

This example illustrates a process for production of the sulfonate (i.e. Alkali Blue), as opposed to the sulfate (i.e. Opal Sulfate).

150 Grams of flaked Opal Blue were slowly added to 330 grams of 98 percent $H_2SO_4$, over a period of two hours, while a temperature of 35° C.±5° C. was maintained. The solution was stirred for an additional hour, after which 165 grams of 98 percent $H_2SO_4$ were added, and the temperature was raised to 45° C., and held at 45° C. until HPLC analysis indicated that sulfonation was complete. The HPLC analysis compared the reaction product to an Alkali Blue standard. The mixture was then drowned in 1400 grams of water, with gentle agitation. The mixture was then filtered, and the resulting cake was washed with about 2000 ml of water, resulting in a filtrate pH of about 1.7. The solids were then redissolved in 1200 grams of water and 38.5 grams of 50 percent NaOH at 80° C., the wash solution having a pH of 11.2. The solution was then cooled to 50° C., filtered, heated to 95° C., and poured into a gently agitated mixture of 1000 grams of water and 199 grams of 38 percent HCl (also heated to 95°), to precipitate the Alkali Blue. Stirring was continued for 15 minutes at 95° C., after which the mixture was cooled to 64° C. by flooding the mixture with cold tap water, followed by filtration. The solids were washed with tap water to a filtrate pH of 2.5, after which the solids were pressed with a rubber dam, to give 722 grams of material with a dry content of 18.6 percent.

We claim:

1. A resin-free pigmentary salt of a triphenylmethane compound, wherein the triphenylmethane compound has the following structure:

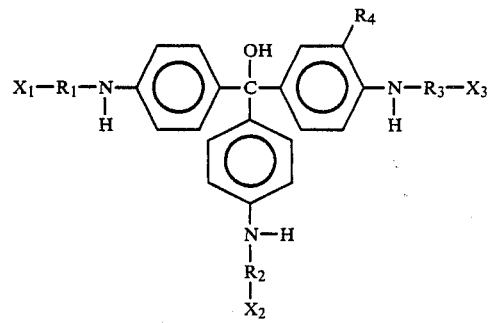

and wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that $X_1$, $X_2$ and $X_3$ is hydrogen when the corresponding $R_1$, $R_2$ or $R_3$ is a direct linkage.

2. A pigment composition as described in claim 1 wherein the composition is comprised of a pigmentary triphenylpararosaniline salt.

3. The pigment composition as described in claim 2 wherein the pigmentary triphenylpararosaniline salt is a salt selected from the group consisting of sulfate, chloride, and phosphate.

4. The pigment composition as described in claim 3 wherein the pigmentary triphenylpararosaniline salt is a sulfate.

5. The pigment composition as described in claim 3 wherein the pigmentary triphenylpararosaniline salt is a mono-salt.

6. A method of making a resin-free pigmentary salt of a triphenylmethane compound, wherein the triphenylmethane compound has the following structure:

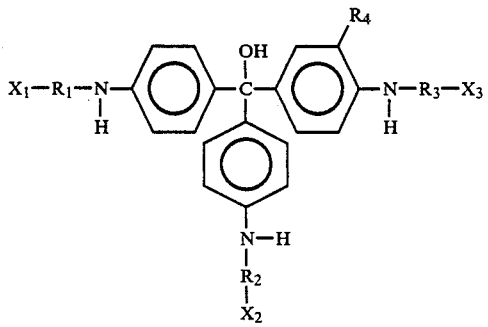

and wherein $R_1$, $R_2$ and $R_3$ are direct linkages, phenyl, or napthyl groups; $R_4$ is hydrogen or methyl; $X_1$, $X_2$ and $X_3$ are hydrogen, halogen, alkyl of 1 to 4 carbons or alkoxy of 1 to 4 carbons; provided that at least one of $R_1$, $R_2$ and $R_3$ is not a direct linkage and provided that at least one of $X_1$, $X_2$ or $X_3$ is hydrogen when the corresponding $R_1$, $R_2$ or $R_3$ is a direct linkage, the method comprising treating the triphenylmethane compound with a dilute acid selected from the group consisting of sulfuric acid, phosphoric acid, and hydrochloric acid, so that a pigmentary triphenylpararosaniline salt is formed.

7. A method as described in claim 6 wherein the triphenylmethane compound is triphenylpararosaniline.

8. The method of claim 7 wherein triphenylpararosaniline in solution is drowned in the dilute acid.

9. The method of claim 7 wherein a triphenylpararosaniline solid is reduced to particles having a pigmentary size, following which the particles are treated in a turbulent solution of the dilute acid.

10. The method wherein triphenylpararosaniline particulates of larger than pigmentary size are simultaneously:
    (a) milled; and
    (b) treated with the dilute acid; so that the pigmentary triphenylpararosaniline salt is formed.

11. The method as described in claim 7 wherein a solution of triphenylpararosaniline is simultaneously:
    (a) treated with dilute acid; while being
    (b) subjected to milling.

12. The method as described in claim 8 wherein the acid is sulfuric acid.

13. The method as described in claim 8 wherein the acid is being agitated during the addition of the dilute acid.

14. The method as described in claim 8 wherein a high shear, turbulent mixer agitates the dilute acid solution during drowning of the solution of triphenylpararosaniline in the dilute acid.

15. The method as described in claim 8 wherein a straight-chain dodecylbenzene sodium sulfonate surfactant is added to the solution of triphenylpararosaniline.

* * * * *